United States Patent [19]

Elson

[11] Patent Number: 4,548,506
[45] Date of Patent: Oct. 22, 1985

[54] NONDESTRUCTIVE ANALYSIS OF MULTILAYER ROUGHNESS CORRELATION

[75] Inventor: John M. Elson, Ridgecrest, Calif.

[73] Assignee: The United States of America as represented by the Secretary of the Navy, Washington, D.C.

[21] Appl. No.: 106,788

[22] Filed: Dec. 26, 1979

[51] Int. Cl.⁴ .......................................... G01N 21/48
[52] U.S. Cl. .................................... 356/446; 356/352
[58] Field of Search ....................... 356/446, 445, 352

[56] References Cited

U.S. PATENT DOCUMENTS 3,850,526  11/1974  Corey ................................. 356/445

FOREIGN PATENT DOCUMENTS 2454644  11/1976  Fed. Rep. of Germany ...... 356/445

OTHER PUBLICATIONS

Elson et al., "Vector Scattering Theory" *Optical Engineering*, vol. 18, No. 2, (Mar.–Apr. 1979), pp. 116–124.

*Primary Examiner*—R. A. Rosenberger
*Attorney, Agent, or Firm*—Robert F. Beers; W. Thom Skeer; Kenneth G. Pritchard

[57] ABSTRACT

A method of evaluating the cross-correlation properties of microroughness present at the interfaces in dielectric stacks is based on a comparison between observed and calculated angular distribution of scattered light. The calculation is based on a first-order perturbation treatment of the interaction of a monochromatic plane wave with a dielectric stack which has microroughness present at each interface. The average deviation of the interface microroughness from the perfectly smooth, ideal, situation is assumed to be much less than the incident wavelength. The theory retains the vector nature of the electromagnetic fields, allows for complex dielectric constants, arbitrary angles of incidence, scattering and polarization. The dielectric stack may have any number of layers of arbitrary optical thickness. In practice, angular scattering data is measured for various incident angles with either p- or s-polarized light. These data are then compared to the calculated distribution of scattered light. By adjusting the interface cross-correlation properties of the dielectric stack model used in the calculation, a best fit between measured and observed data is obtained.

6 Claims, 13 Drawing Figures

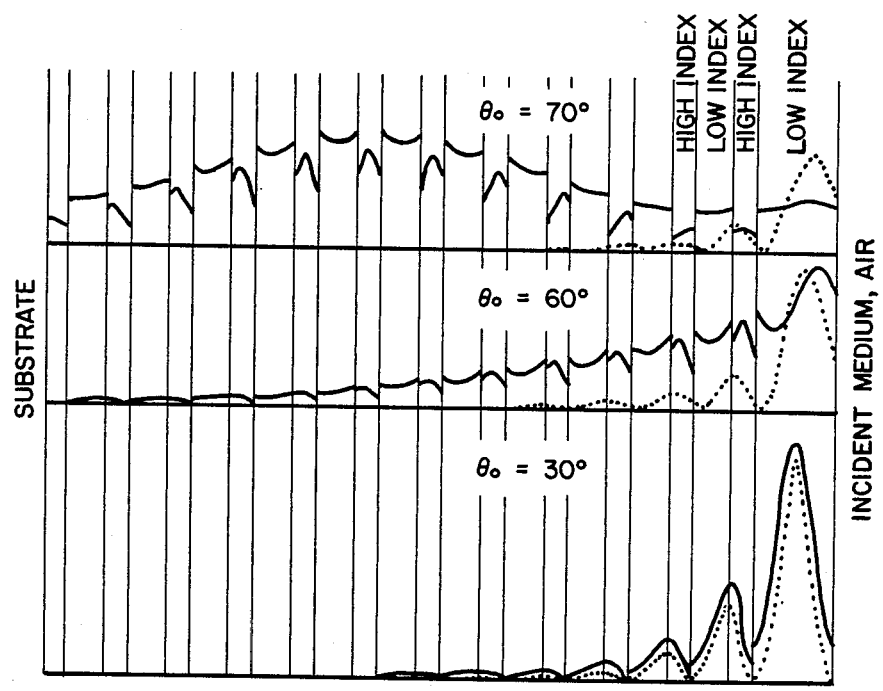
FIG. 3
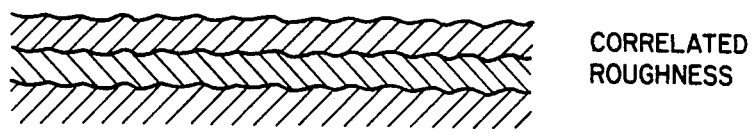
CORRELATED ROUGHNESS
FIG. 4A
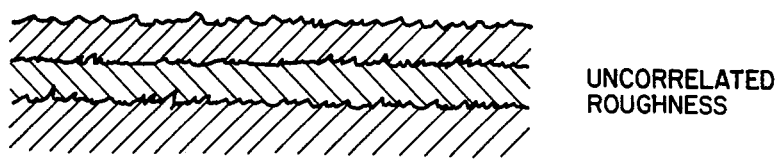
UNCORRELATED ROUGHNESS
FIG. 4B
PARTIALLY CORRELATED ROUGHNESS
FIG. 4C
FIG. 4

NONDESTRUCTIVE ANALYSIS OF MULTILAYER ROUGHNESS CORRELATION

BACKGROUND OF THE INVENTION

1. Field of the Invention

This invention pertains to non-destructive measurement techniques of microroughness cross-correlation properties between boundary layers in multilayered dielectrics. In particular, this invention pertains to a method for evaluating the overall cross-correlation nature of multi-layered dielectric stacks based on comparisons between the measured angular distribution of scattered light and the calculated distributions of scattered light for various dielectric stack models. The various models are based on different cross-correlation properties.

2. Description of Prior Art

In high quality optical systems, such as mirrors handling large amounts of energy, it is important to keep mirror absorption as low as possible to prevent deformation of the mirror surface. To decrease absorption, modern optical systems use multilayer dielectric components which permit higher reflectance levels than for uncoated components. Even where high energy beams are not required, scattered light can seriously degrade the performance of modern optical systems. Examples include the ring laser gyro where retroscattered light is catastrophic.

Previous methods of establishing cross-correlation properties of dielectric stacks included profilometer measurements of each layer after deposition. This is time consuming, very inconvenient and not practical on production dielectric stacks. Another method involves destruction of the stack by cleavage and making visual inspection. This is also not practical since it destroys the stack it measures. Since dielectric stacks are used in optical systems, it is preferred to evaluate the cross-correlation properties in an optical manner.

The angular distribution of scattered light has been evaluated on a theoretical basis for uncoated surfaces and surfaces with a single dielectric layer. In the case of multilayer dielectric stacks, a scalar theory calculation of total integrated scatter, TIS, has been made. The TIS calculation does not retain the vector nature of the electromagnetic fields whereas a vector theory does. The TIS theory relates the root mean square, rms, microroughness to the total amount of scattered light and does not involve measurement of the angular distribution of scattered light. When calculating the angular dependence of scattering from multilayer dielectrics, the autocorrelation and cross-correlation functions associated with the microroughness of the dielectric stack interfaces are needed. These functions provide much more information about the surface than does the rms microroughness value alone. The TIS calculation is based on the scalar Kirchhoff diffraction integral. The relationship between the rms microroughness and TIS is given by $$TIS = 1 - (R/R_o) = 1 - \exp\left[-\left(\frac{4\pi\delta}{\lambda}\right)^2\right] \simeq \left(\frac{4\pi\delta}{\lambda}\right)^2 \quad (A)$$

where $R_o$ is a fraction of the incident light which is reflected into all angles including a specular direction, R is the fraction which is specularly reflected, $\delta$ is the rms height of the surface microirregularities, and $\lambda$ is the wavelength. This relation has been shown to correctly predict the TIS from real optical surfaces including polished and diamond turned metal surfaces.

FIG. 1 shows a typical TIS configuration where a light source 10 emits light on an optical surface 12 which undergoes scattering 14. A collector 16 reflects scatter 14 to a detector 18 which gives a total value of the scattered light. Prior publications describing the above techniques can be found in "Scalar Scattering Theory for Multilayer Optical Coating" by C. K. Carniglia, "Optical Engineering", Vol. 18, No. 2, March/April 1979, page 104, and "Surface Scattering in Optical Interference Coatings", J. M. Eastman, 1974, University Microfilms, Int., Doctoral Thesis Univ. of Rochester.

The TIS measurement has no known method of evaluating the interface cross-correlation properties of multilayer stacks. The previous calculation involving a single dielectric layer could be used to evaluate the cross-correlation properties. This calculation is a special case of the general multilayer theory which is the basis of this invention. The angular distribution of scatter provides an evaluation tool as to whether the multilayer stack has predominantly correlated, partially correlated or uncorrelated interface microroughness. In general, uncorrelated layers provide lower overall scatter, at the design wavelength, from a mirror in a device such as the ring laser gyro than does a correlated dielectric stack. This is because correlated layers produce constructive interference in certain regions of the scattering hemisphere whereas uncorrelated layers tend to yield scattered light with random phase behavior.

SUMMARY OF THE INVENTION

The correlation of roughness between layers of a multilayered stack is evaluated by (1) measuring the angular distribution of scattered light and (2) comparing such measurements with a therory using various assumed models for the correlation of roughness between layers (cross-correlation). A best fit then determines the overall cross-correlation nature of the multilayer stack. The surface is typically illuminated by monochromatic light incident at a predetermined angle. A first approximation to the model dielectridc stack used in the theory can be obtained by making a top surface autocorrelation function determination via profilometer measurements. With this input, the dielectric stack model may be extended into the inner layers of the stack using reasonable assumptions. This autocorrelation measurement is not necessary and, in fact, the shape of the autocorrelation function can be inferred from the angular distribution measurements themselves. However, rather than the shape of the autocorrelation function, it is the behavior of the scattered light versus changes in the angle of incidence that is most revealing.

The theory used to compare with the angle distribution measurements is derived from the wave equation. The interface microroughness is assumed to be much smaller in vertical scale than the incident wavelength. Using small perturbation methods, this leads to an inhomogeneous wave equation which may be solved by Green's function methods. The differential distribution of scattered light is gotten by calculating the Poynting vector and normalizing with respect to incident power. Input parameters to the theory are the angles of incidence, scattering and polarization, and, optical constants, optical thickness, and number of dielectric stack layers.

By varying the incidence angle, or using an incident wavelength different from the design wavelength, the response of scattered light from a multilayered stack may be strongly dependent on the incident polarization and cross-correlation nature of the stack. These facts may be used to control the penetration depth of the incident fields into the multilayer stack thereby controlling the effective number of interfaces sampled by the scattering measurements and calculations.

For any given angle of incidence, different theoretical distribution patterns can be calculated depending on the degree of correlation assumed. By a systematic search, for a given angle of incidence, a best fit or closest approximation can be obtained between the theoretical models of different correlations and the actual observed angular distribution. This systematic search process to match an observed angular distribution can be repeated for different angles of incidence. By comparing the best fit for a desired range of angles of incidence, an overall correlation relationship can be characterized for a given multilayered stack. This overall evaluation can determine both the useability and practicality of either a dielectric multilayer stack or a fabrication process for dielectric multilayer stacks suitable as mirrors. In addition, preferred angles may be determined for given processes or particular dielectric stacks to minimize scatter by selective choice of mirror orientation.

BRIEF DESCRIPTION OF THE DRAWINGS

FIG. 3 is a plot of the relative distribution of electric field intensity in a twenty-four layer dielectric for three different incident angles.

FIG. 4 shows three examples of different types of correlation possible between dielectric layer interfaces.

DESCRIPTION OF PREFERRED EMBODIMENT

Figure 1:
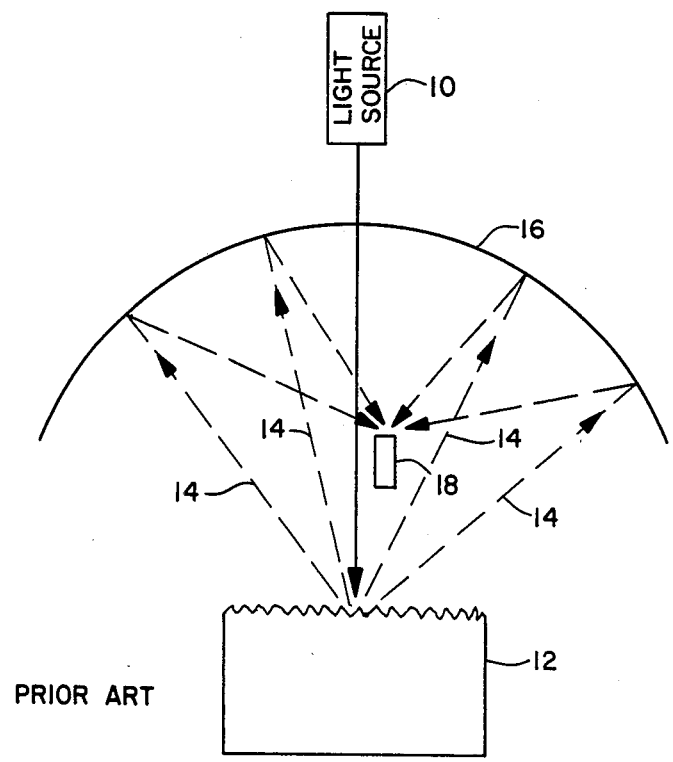
FIG. 1 is a prior art TIS system.

A typical experimental setup for measuring TIS is shown in FIG. 1. The specular direction of reflectance would follow the normal optical rule of angle of incidence equals angle of reflection. However, the presence of microroughness gives rise to diffuse scattered light which is collected by curvilinear mirror 16 and focused into optical detector 18. In FIG. 1, the specular direction is back along the incident path towards the light source. Thus, the idea is to illuminate the optical specimen and collect the total amount of scattered light which is then related to the rms value via Equation A. Although not shown here, the corresponding TIS equation for multilayered surfaces is much more involved.

Figure 2:
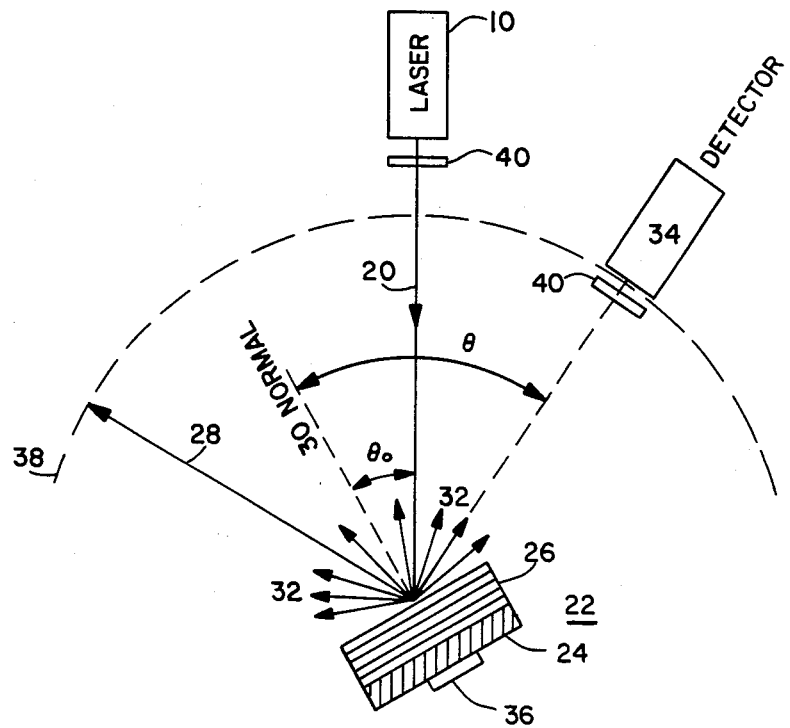
FIG. 2 is a diagram of a measuring arrangement for the present invention.

A typical experimental setup used to measure the angular distribution of scattered light as required for this invention is shown in FIG. 2. Laser source 10 provides an incident light beam 20 which illuminates a dielectric stack 22. Any wavelength can be used provided a suitable detector 34 exists to measure that wavelength and the wavelength is much greater than the rms value of microroughness. Laser 10 is stationary on an optical table and the angle of incidence, $\theta_0$, is changed by a movable mirror mount 36 attached to the mirror substrate 24. The specular beam reflected from the dielectric stack layers 26 is along arrow 28. The angle of incidence $\theta_0$ as measured between the incident beam 20 and surface normal 30 equals the specular reflection angle as measured between arrow 28 and the normal 30. The microroughness is responsible for diffuse scattered light 32. A light detector 34, such as a photomultiplier tube, is mounted so it travels along hemispherical path 38. The polar scattering angle $\theta$ is typically measured from the surface normal 30. By moving the detector along path 38, the distribution of scattered light can be measured. Note that path 38, incident beam 20, specular beam 28, and measured scattered light 32 are all in the same plane. Polarizers 40 are used to select the desired polarization of incient and measured scattered light. A typical light source 10 which can be used in this measurement is a HeNe laser.

For multilayered reflecting surfaces, the angular distribution of scattered light can be strongly affected by the correlation properties of microroughness between interfaces of the multilayer stack. This is one of the characteristics that make this invention feasible. Also, for multilayered stacks, such as shown in FIG. 3, the penetration depth and electric field intensity distribution can be controlled by varying the angle of incidence. This can be very helpful in allowing the scattered light to be generated predominately by the outermost layers of all the layers as desired. In FIG. 3, the incident angles $\theta_0$ of 30°, 60° and 70° show the variation in electric field intensity distribution in a 24 layer dielectric stack. The vertical lines, which show no microroughness, represent the interfaces of the dielectric stack. The solid lines represent the electric field intensity distribution throughout the interior of the dielectric stack for p-polarized incident light. The dashed lines represent s-polarized light. The p- or s-polarized terminology refers to the electric vector as parallel, p, or perpendicular, s, to the incident plane. This differing response of multilayer stacks to different polarizations may be used with the theory to sample various numbers of interfaces by controlling the penetration depth of the incident fields.

FIG. 4 shows three examples of interface correlation for a two-layer system. The correlated example in FIG. 4a has all profiles identical. It is understood that the actual sample is correlated in three dimensions rather than the two dimensions shown in FIG. 4a. Also shown is an uncorrelated example, FIG. 4b. All interfaces are independent and have zero cross-correlation. In the partially correlated example of FIG. 4c, the relationship between interfaces is a mixture of the extremes of correlated and uncorrelated. Physically, the correlated model provides coherent planes of scattering currents which are in phase and are generated by the microroughness. The uncorrelated model yields independent planes of scattering currents whereas the partially correlated model stack is a mixture of these two extremes.

The theory used in this invention to calculate the angular distribution of scattered light may be generally written as $$<dP/d\Omega>/P_0 = \qquad (B)$$

$$\frac{(\omega/c)^4}{(4\pi)^2 \cos\theta_0 S} \sum_{m=1}^{L+1} \sum_{n=1}^{L+1} \left[ \frac{a_\phi^{(m)} a_\phi^{(n)*}}{|\beta_{11}(1, L+1)|^2} \cos^2\theta + \right.$$

$$\frac{a_\theta^{(m)} a_\theta^{(n)*}}{|\sigma_{11}(1,L+1)|^2} \Bigg] < \zeta_m(\vec{k}-\vec{k}_o)\zeta_n^*(\vec{k}-\vec{k}_o)>$$

where $P_o$ is the power incident on area S and $dP/d\Omega$ is the differential power dP scattered per unit solid angle $d\Omega = \sin\theta d\theta d\phi$. The polar angle of incidence, measured from the surface normal is $\theta_0$ and the polar and azimuthal angles of scattering are $\theta$ and $\phi$ respectively. The number of layers in the stack is L and hence the sum over indices m and n range over L+1 interfaces. The factor $\omega/c = 2\pi/\lambda$ where $\lambda$ is the incident wavelength. The factors $a_\theta^{(i)}$ and $a_\theta^{(i)}$ contain the complicated phase relationships due to the optical thickness of the various stack layers. These functions contain parameters relating to the incident fields, scattered fields, optical constants and angles of incidence and scattering. The symbol * in Equation B denotes complex conjugate. The denominators $|\beta_{11}(1,L+1)|^2$ and $|\sigma_{11}(1,L+1)|^2$ are matrix elements resulting from a product of L matrices which are associated with the properties of the L layers of the stack. The $a_\phi^{(i)}$ and $a_\theta^{(i)}$ terms of Equation B refer to s- and p-polarization of the scattered light measured relative to the plane of scattering. The $a_\phi^{(i)}$ and $a_\theta^{(i)}$ terms are not related to the microroughness of the interfaces. However, details of the roughness are contained in $$\xi_m(\vec{k}-\vec{k}_o) = \int d^2\rho e^{i(k-k_o)\cdot\vec{\rho}} \xi_m(\vec{\rho}) \tag{C}$$

Equation C represents the Fourier transform of the profile $\xi_m(\vec{\rho})$ of the m th interface where $\vec{\rho}=(x,y)$ is a position vector. The vector $\vec{k}-\vec{k}_o$ represents the net transverse wavevector change, due to scattering, were $\vec{k}_o$ and $\vec{k}$ are the wavevector components parallel to the scattering surface, of the incident and scattered light respectively. The symbol $<>$ denotes ensemble average, which acts on terms containing the random variables $\xi_i(\vec{k}-\vec{k}_o), i=1,L+1$. Note, that this invention is equally applicable to multilayer grating surface profiles as well as random roughness. However, the restriction that the wavelength is much greater than the vertical scale of the grating profile still applies. A detailed description of the $a_\phi^{(i)}$ and $a_\theta^{(i)}$ and how to evaluate these expressions is incorporated by reference to the following, J. M. Elson, "Infrared Light Scattering from Surfaces Covered with Multiple Dielectric Overlayers", Applied Optics. 16, p. 2876 (1977) (see Equation 17) and J. M. Elson, "Low Efficiency Diffraction Grating Theory", Air Force Weapons Laboratory, Kirtland AFB, NM, Technical Report AFWL-TR-75-210 (1976). In most models with any degree of simplicity, the double sum of Equation B reverts to a single sum. As an example, for the correlated stack all interfaces are identical and thus $<\xi_m(\vec{k}-\vec{k}_o)\xi_n^*(\vec{k}-\vec{k}_o)> = <|\xi(k-k_o)|^2>$ for all m and n. For the uncorrelated case, $<\xi_m(\vec{k}-\vec{k}_o)\xi_n^*(\vec{k}-\vec{k}_o)> = 0$ for $m \neq n$ and $<|\xi_n(\vec{k}-\vec{k}_o)|^2>$ for m=n. As an example of a partially correlated model, it may be assumed that $<\xi_m(\vec{k}-\vec{k}_o)\xi_n^*(\vec{k}-\vec{k}_o)> = <|\xi(\vec{k}-\vec{k}_o)|^2> + <|\xi_l(\vec{k}-\vec{k}_o)|^2>$, l=2,L+1. In this model the first term results from the substrate profile and permeates throughout the dielectric stack analogous to the correlated model. The second term results from an additive microroughness component which is independent of the base substrate profile. Note that the $\xi_i(\vec{k}-\vec{k}_o)$ may be different for each interface.

Figure 5:
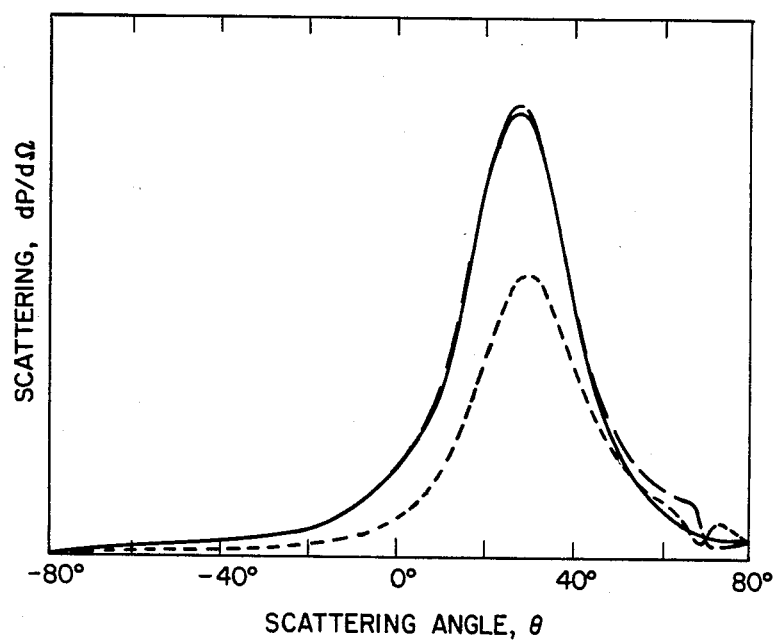
FIG. 5 is an example of the scattering change a multilayer stack can produce on a surface.

FIG. 5 is a theoretical plot of the differences between scattering in the plane of incidence from an opaque Ag film, solid curve, and the same surface overcoated with 24 alternating high and low index layers, $\lambda/4$ optical thickness at 30° incidence angle, unpolarized light incident at 30°. The long-dashed curve is for a correlated stack model and the short-dashed curve is for an uncorrelated stack model. The wavelength $\lambda=0.6328$ micron and the complex optical dielectric constants are (−16.4, 0.53) for silver, (5.48,O) for the high index layer and (2.16,O) for the low index. Note that the small difference between the solid and long-dashed curve about the specular (30°) direction is due to the increased reflectance of the multilayer stack and the constructive interference nature of the correlated model at the design angle of 30°. However, the uncorrelated model shows a marked reduction in overall scatter. Further discussion of this plot is given in, J. M. Elson, =Vector Scattering Theory", Optical Engineering, vol. 18, page 116 March/April (1979).

Figure 6:
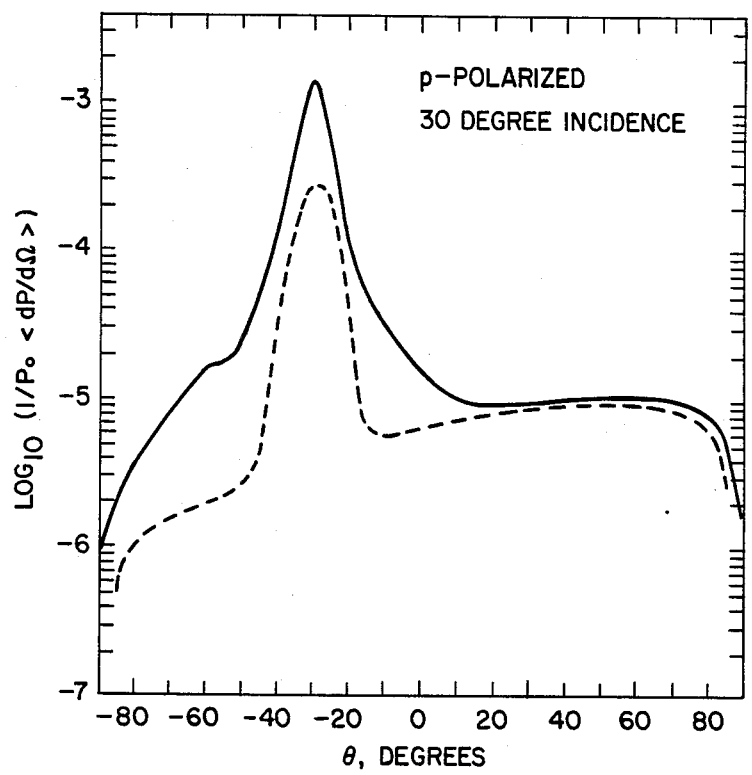
FIGS. 6–11 show the change in scattering for different incident angles of illumination.
Figure 7:
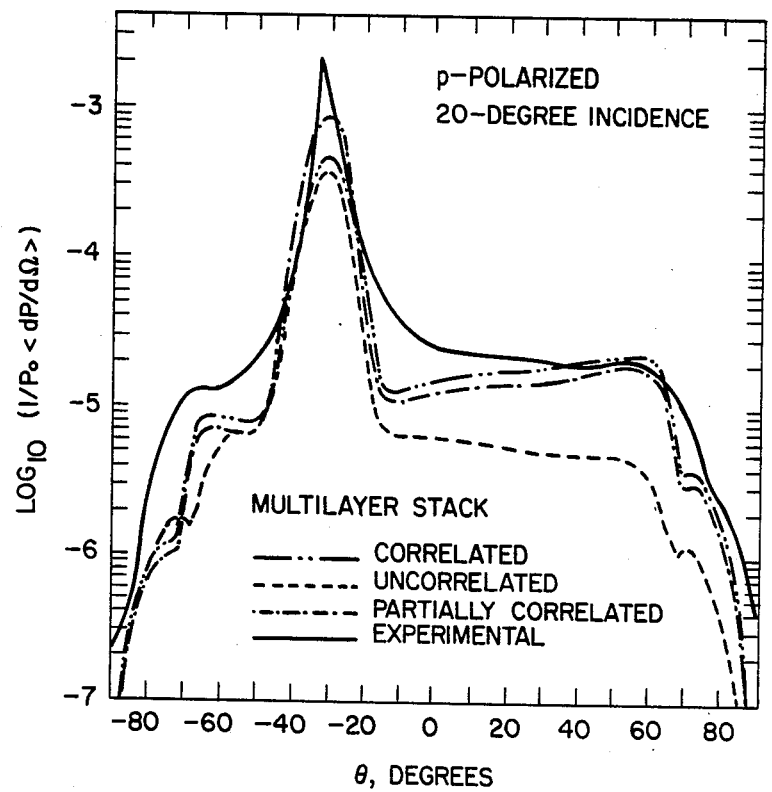

An example of how the comparison between experiment and theory appears is given in FIG. 6. Here the surface is an uncoated Al film. The measured values are shown by the solid curve and the calculated values by the dashed curve. In the near specular region, $\theta_0=30°$, comparison between theory and experiment is poor. No attempt has been made to force-fit the theory here. However, the region beyond $\theta=10°$ fits well. It is felt that the region about the specular direction is a poor region to use for experiment-theory fitting in the spirit of this invention because (1) this region requires a detailed knowledge of the long range autocorrelation nature of the roughness and (2) that surface particulates, dust, etc., generate increased forward Mie scattering above that due to microroughness alone. Also, it is felt that the region $\theta > 10°$ is due to microroughness scattering. Note that this example is for an uncoated surface.

Figure 8:
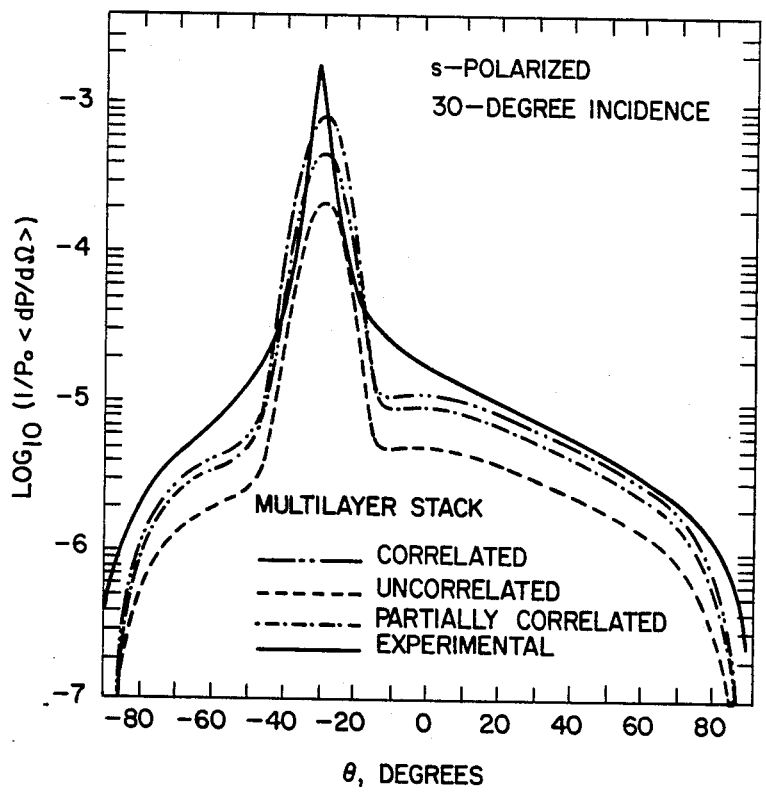
Figure 9:
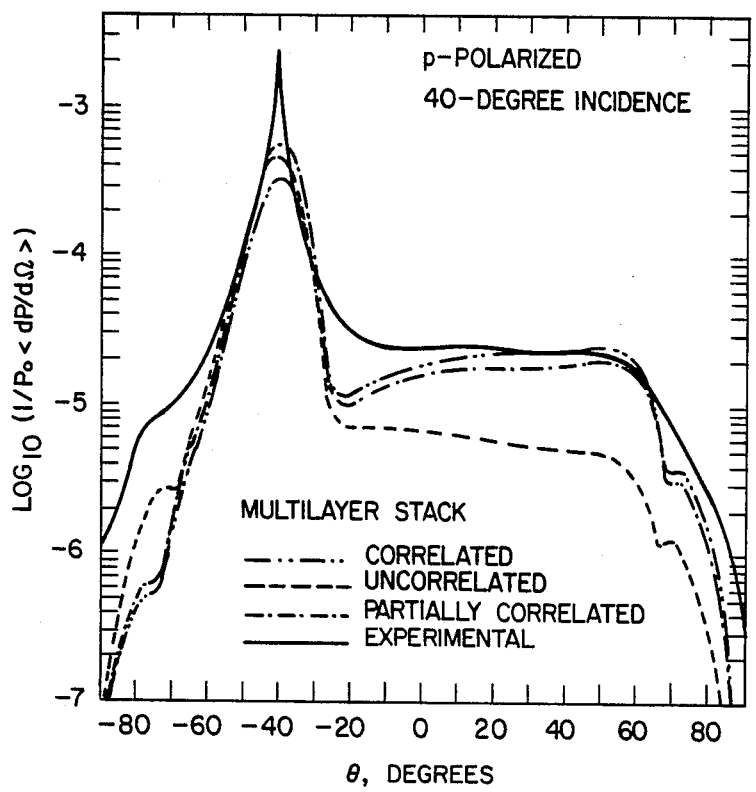
Figure 10:
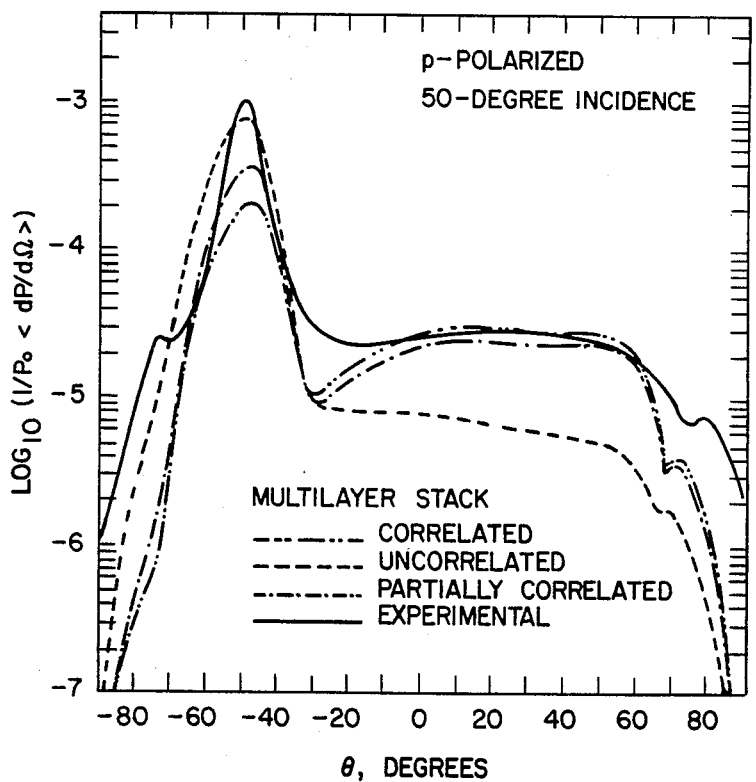
Figure 11:
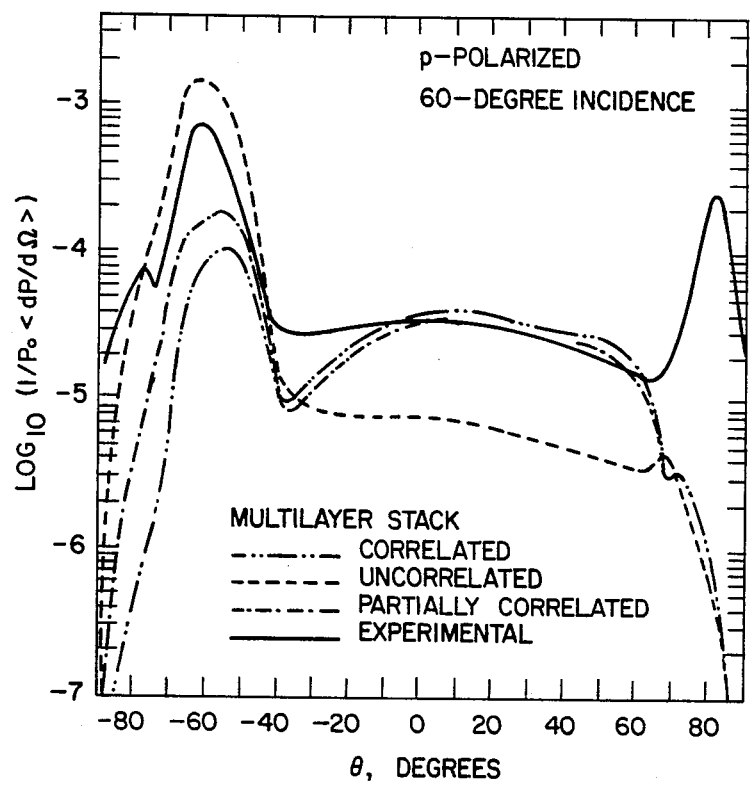

FIGS. 7–11 are for a 24 layer laser-gyro mirror example. FIG. 8 is for s-polarized incidence and scattering in the plane of incidence and the rest are for p-polarized incidence and scattering. Again the region beyond $\theta > 10°$ provides the best region with which to compare. Note that no attempts have been made to use sophisticated dielectric stack models beyond the correlated, uncorrelated, and partially correlated examples. Discussion about polarization angle anomalies and how to control the penetration depth into multilayer stacks by selective polarization and angles of incidence is given by J. M. Elson, "Diffracion and Diffuse Scattering for Dielectric Multilayers", Journal of the Optical Society of America, vol. 69, page 48 (1979).

Added information about surface microroughness can be obtained by measuring the top surface of a multilayer stack with a profilometer. This information can be used to calculate a top surface autocorrelation function. Thus, this would provide a top surface autocorrelation function "boundary conditions" to use when determining the model dielectric stack. Note that $$\frac{<\zeta_m(\vec{k}-\vec{k}_o)\zeta_n^*(\vec{k}-\vec{k}_o)>}{S} = \int d^2\tau e^{i(\vec{k}-\vec{k}_o)\cdot\vec{\tau}} G_{mn}(\vec{\tau})$$

where $G_{mn}(\vec{\tau}) = <\xi_m(\vec{\rho})\xi_n(\vec{\rho}+\vec{\tau})>$ is the cross-correlation function between the m th and n th layers.

What is claimed is:

1. A method for determining the correlation between layers in dielectric multilayers by nondestructive testing comprising the steps of:
   illuminating a dielectric multilayer with a beam of monochromatic light at a predetermined angle of incidence;
   measuring the angular distribution of scattered light from said multilayer stack;
   calculating the angular distribution of scattered light from said multilayer stack based on an assumed correlation relation between said multilayers;
   comparing said measured angular distribution to said calculated angular distribution;
   repeating said calculating and comparing steps for different assumed correlations between said multilayers until the closest fit between said calculated and measured angular distribution is identified; and
   redoing said illuminating, measuring, calculating, comparing, and repeating steps for a different angle of incidence of light on said multilayer stack a plurality of times, said plurality being determined by the number of different angles of incidence needed to evaluate a characteristic correlation relationship describing said multilayer stack for all angles of incidence.

2. A method for determining the correlation between layers in dielectric multilayers by nondestructive testing as described in claim 1 wherein said illuminating step comprises polarized monochromatic light.

3. A method for determining the correlation between layers in dielectric multilayers by nondestructive testing as described in claim 2 wherein said polarized monochromatic light is p-polarized.

4. A method for determining the correlation between layers in dielectric multilayers by nondestructive testing as described in claim 3 wherein said assumed correlation relation in said calculating step is based on a roughness measurement of the top surface of said multilayer stack.

5. A method for determining the correlation between layers in dielectric multilayers by nondestructive testing as described in any of claims 1, 2, 3, or 4 wherein said calculating step comprises:
   applying first order perturbation theory to the wave equation to obtain an inhomogeneous equation for the scattered light from polished optical surfaces; and using a mathematical technique to solve said inhomogeneous equation.

6. A method for determining the correlation between layers in dielectric multilayers by nondestructive testing as described in any of claims 1, 2, 3, or 4 herein said calculating step comprises: d
   applying first order perturbation theory to the wave equation to obtain an inhomogeneous equation for the scattered light from polished optical surfaces; and
   using the mathematical technique known as Green's Function to solve said inhomogeneous equation.

* * * * *